(12) United States Patent
Oliveira et al.

(10) Patent No.: US 8,148,949 B2
(45) Date of Patent: Apr. 3, 2012

(54) USE OF HIGH FREQUENCY TRANSFORMER TO CHARGE HEV BATTERIES

(75) Inventors: Gary A. Oliveira, Lake Orion, MI (US); Curt D. Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 220 days.

(21) Appl. No.: 12/709,598

(22) Filed: Feb. 22, 2010

(65) Prior Publication Data

US 2010/0213902 A1    Aug. 26, 2010

Related U.S. Application Data

(60) Provisional application No. 61/154,965, filed on Feb. 24, 2009.

(51) Int. Cl.
   *H02J 7/04* (2006.01)
   *H02J 7/06* (2006.01)
   *H02J 7/00* (2006.01)
(52) U.S. Cl. ............... 320/145; 320/104; 320/141
(58) Field of Classification Search ............. 320/145
   See application file for complete search history.

(56) References Cited

U.S. PATENT DOCUMENTS

| | | | |
|---|---|---|---|
| 4,654,573 A | 3/1987 | Rough et al. | |
| 5,969,624 A | 10/1999 | Sakai et al. | |
| 6,281,660 B1 | 8/2001 | Abe | |
| 6,791,295 B1 | 9/2004 | Berels | |
| 6,904,342 B2 | 6/2005 | Hanada et al. | |
| 7,098,558 B2 * | 8/2006 | Okuma et al. | 307/66 |
| 7,126,240 B2 * | 10/2006 | Albert | 307/10.3 |
| 7,765,964 B2 * | 8/2010 | Ichimoto | 123/90.15 |
| 2002/0140397 A1 | 10/2002 | Hasegawa et al. | |
| 2004/0021441 A1 * | 2/2004 | Komiyama et al. | 320/104 |
| 2004/0108831 A1 | 6/2004 | Cartwright et al. | |
| 2004/0130288 A1 | 7/2004 | Souther et al. | |
| 2005/0068003 A1 | 3/2005 | Gauthier et al. | |
| 2005/0088144 A1 | 4/2005 | Pacholok et al. | |

FOREIGN PATENT DOCUMENTS

| | | |
|---|---|---|
| EP | 1493608 A2 | 1/2005 |
| EP | 1990910 A1 | 11/2008 |
| EP | 2000366 A2 | 12/2008 |
| JP | 9009417 A | 1/1997 |
| JP | 2000341801 A | 12/2000 |
| JP | 2004229461 A | 8/2004 |

OTHER PUBLICATIONS

International Search Report for International Patent Application No. PCT/US2010/025132, dated Sep. 28, 2010.

* cited by examiner

*Primary Examiner* — M'Baye Diao
(74) *Attorney, Agent, or Firm* — Harness, Dickey & Pierce, P.L.C.

(57) ABSTRACT

A system for charging a high voltage battery includes a low DC voltage battery, a DC-to-AC converting circuit, a controller, an AC-to-DC converting circuit and a high DC voltage battery. The low voltage battery outputs a low DC voltage signal. The DC-to-AC converting circuit receives the low DC voltage signal to convert into a chopped DC voltage signal. The DC-to-AC converter outputs a high AC voltage signal corresponding to the chopped DC voltage signal. The controller controls a duty cycle of the chopped DC voltage signal. The AC-to-DC converting circuit converts the high AC voltage signal into a high DC voltage signal. The high voltage battery charges using the high DC voltage signal. A method for charging a high voltage battery is also provided.

16 Claims, 6 Drawing Sheets

USE OF HIGH FREQUENCY TRANSFORMER TO CHARGE HEV BATTERIES

INTRODUCTION

The present disclosure generally relates to an on-board energy charging system for a hybrid electric vehicle (HEV) and more particularly to a battery charging system that employs a high frequency transformer to convert a low voltage signal from a low voltage source of electricity into a high voltage signal for charging a high voltage battery.

HEV's typically employ a first propulsion system, which is based on an internal combustion engine, and a second propulsion system, which is based on one or more electric motors, to provide propulsive power. It would be advantageous from the perspective of vehicle manufacturers and consumers if the first propulsion system were to employ conventional low voltage direct current (i.e., 12VDC) circuitry and systems for conventional vehicle systems, such as engine starting, etc. The second propulsion system, however, typically employs relatively high voltage electrical power.

The different power requirements for the two propulsion system could employ two different battery charging systems (i.e., one charging system for generating high voltage power and one charging system for generating low voltage power). For example, two different power generators (e.g., a high voltage DC generator and an alternator) could be employed to produce the desired electrical energy, but this approach is relatively costly and adds considerable weight to the vehicle. Moreover, it can be difficult for a vehicle manufacturer to transform a conventionally powered vehicle into an HEV when significant changes to the vehicle platform are required.

Adding a DC-DC converter to a conventional 12VDC vehicle electrical system may provide a high level of commonality between the electrical system of a conventionally powered vehicle and its hybrid electric powered counterpart. The drawback with this approach is that the known DC-DC converters are relatively large, heavy and inefficient in their power conversion. Accordingly, there remains a need in the art for an improved vehicle electric system that is readily convertible from a conventionally powered vehicle platform to a platform that supports the charging of both high and low voltage batteries.

SUMMARY

In one form, the present teachings provide a system for charging a high voltage battery that includes a low DC voltage battery, a DC-to-AC converting circuit, a controller, an AC-to-DC converting circuit and a high DC voltage battery. The low voltage battery outputs a low DC voltage signal. The DC-to-AC converting circuit is electrically coupled to the low voltage battery. The DC-to-AC converting circuit receives and converts the low DC voltage signal into a chopped DC voltage signal. The DC-to-AC converter outputs a high AC voltage signal corresponding to the chopped DC voltage signal. The controller is electrically coupled to the DC-to-AC converting circuit. The controller controls a duty cycle of the chopped DC voltage signal. The AC-to DC converting circuit is electrically coupled to the DC-to-AC converting circuit. The AC-to-DC converting circuit converts the high AC voltage signal into a high DC voltage signal. The high voltage battery is electrically coupled to the AC-to-DC converting circuit. The high voltage battery charges using the high DC voltage signal.

In another form, the present teachings provide a method of charging a high voltage battery that includes: outputting a low DC voltage signal from a low voltage battery; converting the low DC voltage signal into a copped low DC voltage signal; converting the chopped low DC voltage signal into a high AC voltage signal; converting the high AC voltage signal into a high DC voltage signal; and charging the high voltage battery with the high DC voltage signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
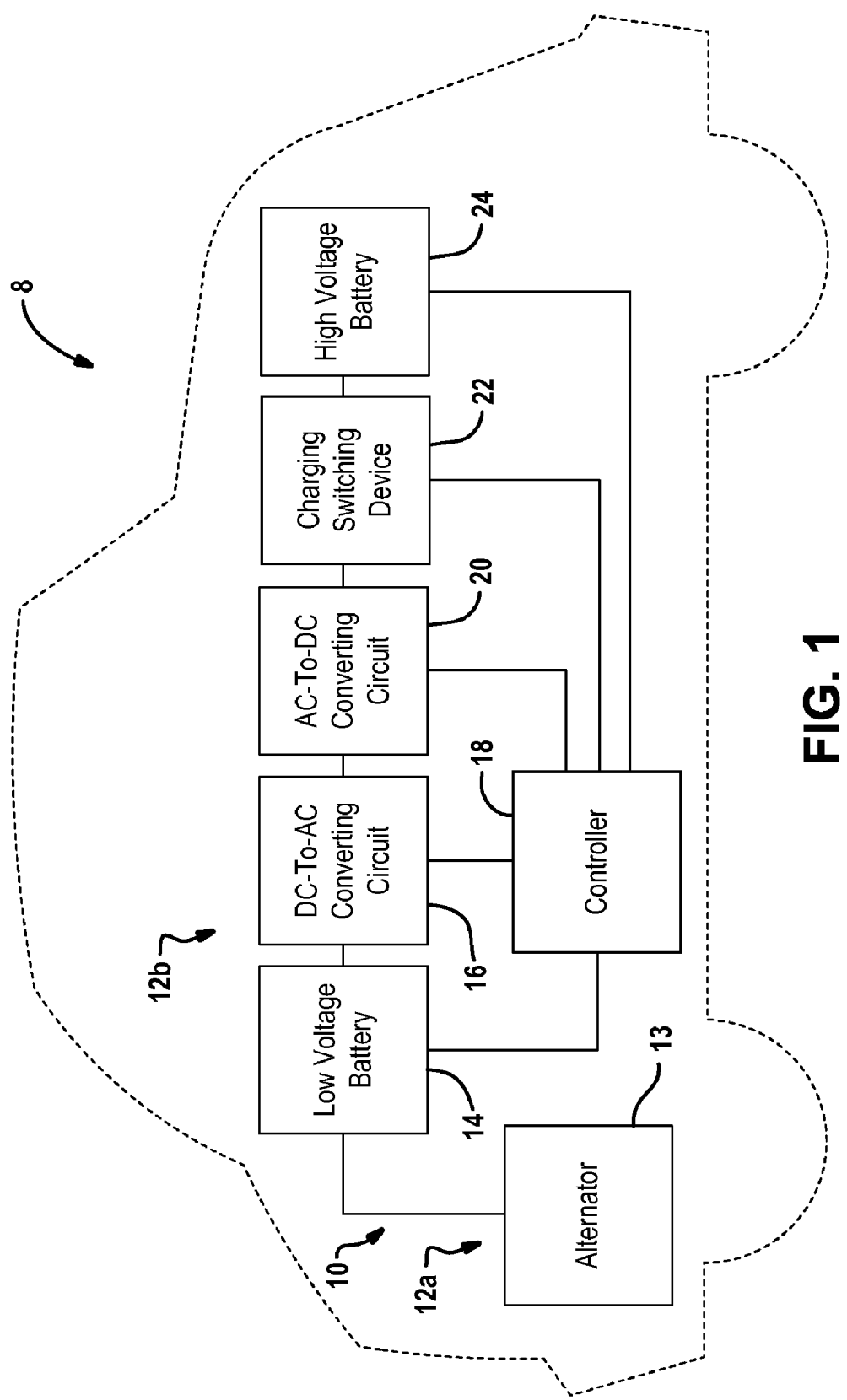
FIG. 1 is a schematic illustration of an exemplary charging system constructed in accordance with the teachings of the present disclosure.

With reference to FIG. 1 of the drawings, a hybrid electric vehicle (HEV) 8 is illustrated to include a battery charging system 10 that is constructed in accordance with the teachings of the present disclosure. The remainder of the HEV 8 can be constructed in any appropriate manner, such as that which is disclosed in U.S. patent application Ser. No. 11/415,457 entitled "Vehicle With Hybrid Power Train Providing Part-Time All-Wheel Drive", the disclosure of which is hereby incorporated by reference as if fully set forth in detail herein. The battery charging system 10 can include a low voltage portion 12a and a high voltage portion 12b. The low voltage portion 12a can be configured in a conventional manner and can include an alternator 13 that is configured to produce relatively low voltage direct current electrical power (e.g., 12 volt DC electric power) for charging a low voltage battery 14. The low voltage battery 14 can be employed for powering conventional low voltage auxiliary vehicle systems (not shown), such as head lamps, brake lamps, turn signals, windshield wipers, an engine starting motor, etc.

The high voltage portion 12b can include a DC-to-AC converting circuit 16, a controller 18, an AC-to-DC converting circuit 20, and a charging switching device 22. The high voltage portion 12b can be configured to charge a high voltage battery 24 having a voltage that is relatively higher than a voltage of the low voltage battery. The high voltage battery 24 can be employed for powering conventional high voltage auxiliary systems (not shown) and/or an electric motor (not shown) that is associated with an electrically-driven portion of the powertrain (not shown) of the HEV 8. The high voltage battery 24 can include a plurality of high voltage batteries, such as three low voltage batteries that are coupled in series as shown in FIG. 3.

Additionally, in the particular example provided, the low voltage battery 14 has a voltage of about 12 volts and the high voltage battery 24 has a voltage of about 24-36 volts. Those of ordinary skill in the art will appreciate that other voltages can be employed. Those of ordinary skill in the art will also appreciate that either battery 14, 24 can be any type of battery, including a lead-acid battery, a nickel-cadmium battery, a nickel-metal hydride battery, lithium Ion battery or a lithium polymer battery.

Figure 2:
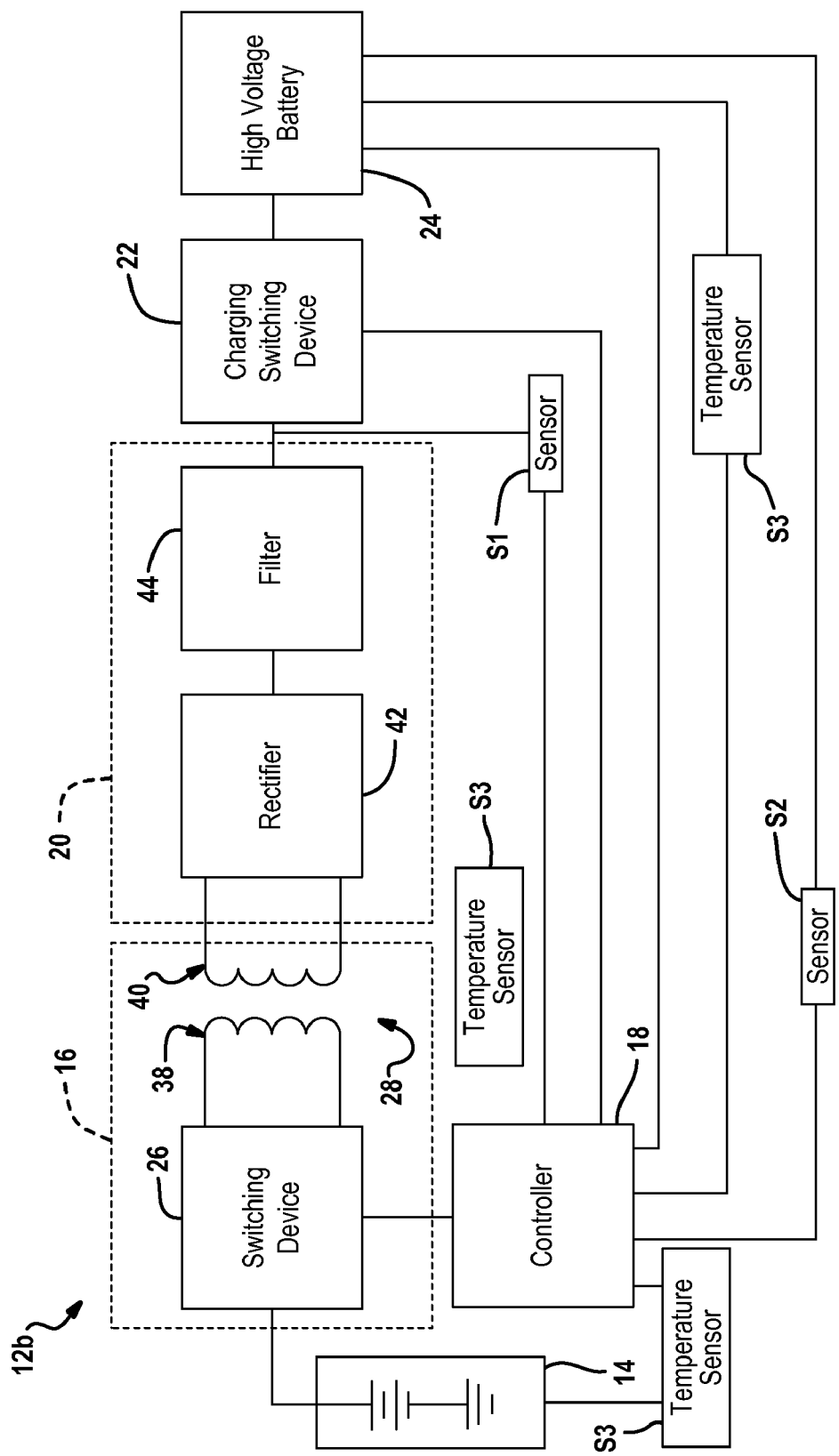
FIG. 2 is a schematic illustration of the charging system of FIG. 1.

With reference to FIG. 2, the DC-to-AC converting circuit 16 can receive a low DC voltage signal. In the particular example provided, the DC-to-AC converting circuit 16 is electrically coupled to the low voltage battery 14 and receives the low DC voltage signal therefrom. The DC-to-AC converting circuit 16 can include a switching device 26 and a transformer 28. The switching device 26 is electrically coupled to the transformer 28. The switching device 26 can convert the low DC voltage signal into a pulse width modulated (PWM) signal or a chopped low DC voltage signal T (FIG. 4) having a predetermined high frequency and a predetermined duty cycle. The transformer 28 can convert the chopped low DC voltage signal into a corresponding high AC voltage signal.

Figure 3:
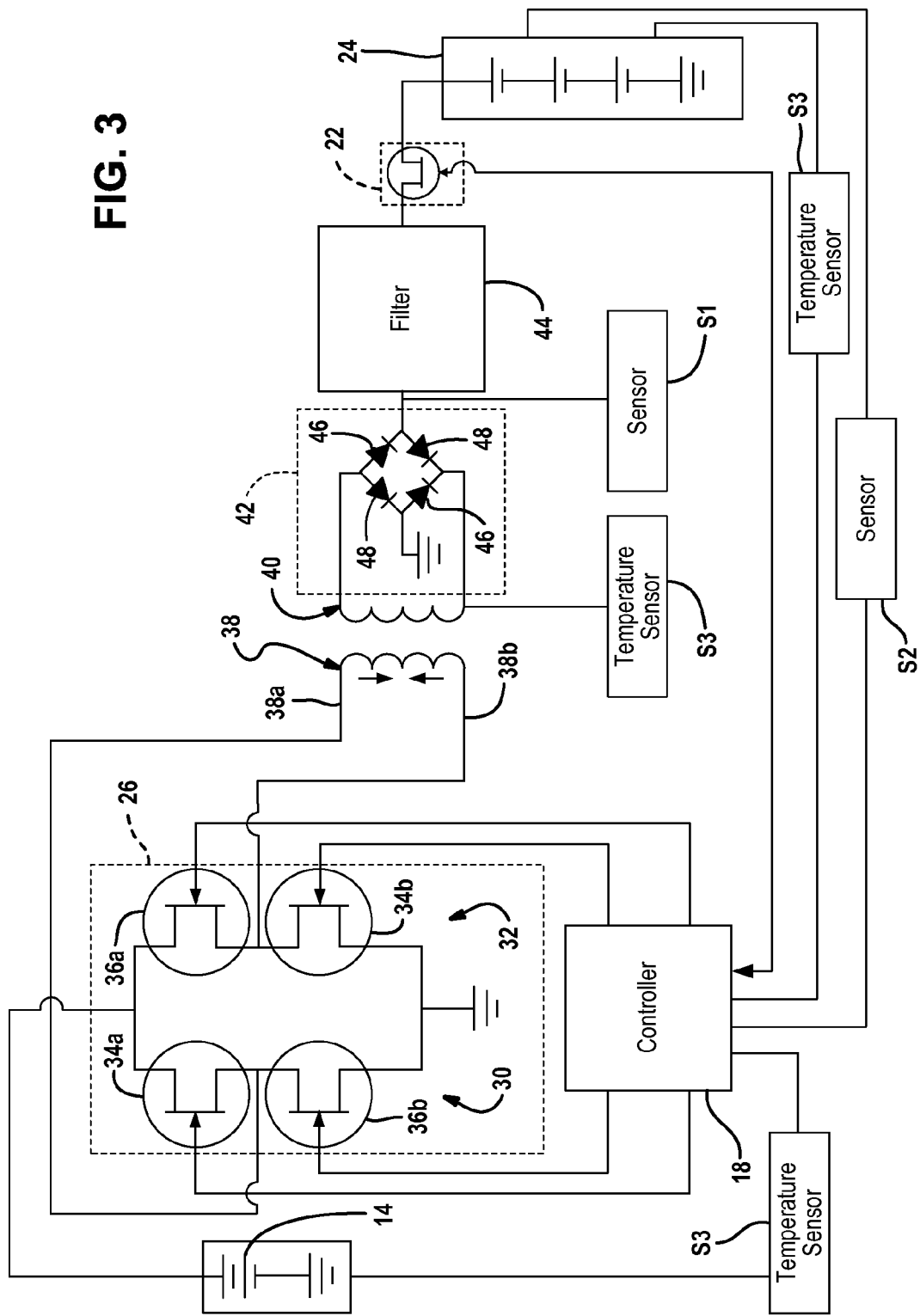
FIG. 3 is a detailed schematic illustration of the charging system of FIG. 1.

With additional reference to FIG. 3, the switching device 26, in the particular example provided can include a plurality of transistors 30, such as bipolar junction transistors (BJTs), field effect transistors (FETs) and/or MOSFET transistors, that perform as electronic switches. When the transistors 30 are OFF, the transistors 30 are virtually an open circuit. Yet when the transistors 30 are ON, the transistors 30 are very close to a short circuit.

The switching device 26 can be configured in an H-bridge configuration 32. The H-bridge configuration 32 can include a first pair of transistors 34 having a first transistor 34a and a second transistor 34b and a second pair of transistors 36 having a third transistor 36a and a fourth transistor 36b. The switching device 26 can be operated by the controller 18. Further discussion regarding the controller 18 will follow.

The transformer 28 can receive and convert the chopped low DC voltage signal T into the corresponding high AC voltage signal. The transformer 28 can include a high-frequency step-up transformer having a primary winding 38 and a secondary winding 40. The chopped low DC voltage signal T is received by the primary winding 38. The secondary winding 40 outputs the corresponding high AC voltage signal. The primary winding 38 and the secondary winding 40 are formed around a core (not shown). The core can comprise an air-core or ferrite-core. When the chopped low DC voltage signal T is received by the primary winding 38, the core provides a magnetic path so that a magnetic flux is concentrated close to coils of each of the primary winding 38 and the secondary winding 40. The amount of the chopped low DC voltage signal T that is stepped up depends on a turn ratio of the transformer 28. The turn ratio can be defined as a ratio of a number of turns in the secondary winding 40 to a number of turns in the primary winding 38. The turn ratio for the step-up transformer 28 is always greater than 1 because the turns in the secondary winding 40 are always greater than the number of turns in the primary winding 38. For example, the transformer 28 can have a turn ratio of 4:1.

Figure 4:
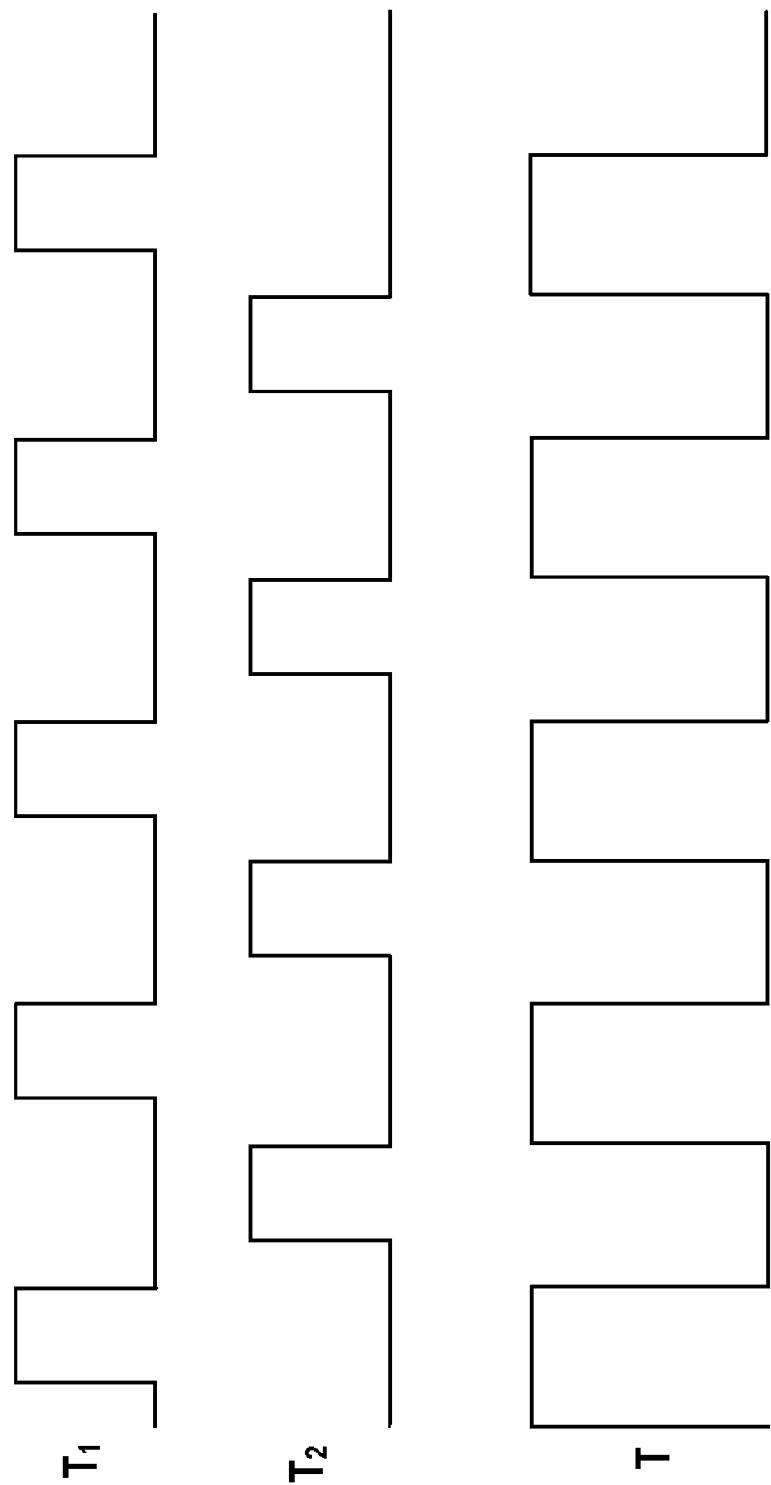
FIG. 4 is a plot of exemplary signals of the charging system of FIG. 1.

With reference to FIGS. 3 and 4, the switching device 26 can be operated in a first condition and a second condition. In the first condition, the first pair of transistors 34 is ON and the second pair of transistors 36 is OFF. In this condition the low DC voltage signal flows through the first transistor 34a, into a top 38a of the primary winding 38 of the transformer 28 and to ground via the second transistor 34b to convert the low DC voltage signal into a first portion $T_1$ of the chopped low DC voltage signal T. Conversely, in the second condition, the first pair of transistors 34 is OFF and the second pair of transistors 36 is ON. In this condition the low DC voltage signal flows in an opposite direction through the third transistor 36a, into a bottom 38b of the primary winding 38 and to ground via the forth transistor 36b to convert the low voltage signal into a second portion $T_2$ of the chopped low DC voltage signal T.

By alternately switching each pair of transistors 34, 36, the low DC voltage signal is made to flow from first the top 38a to the bottom 38b of the primary winding 38 and then the bottom 38b to the top 38a of the primary winding 38. This produces an alternating magnetic flux in a core of the transformer 28. As a result, the corresponding AC voltage signal is induced in the secondary winding 40 of the transformer 28. Since the second winding 40 has more turns than the primary winding 38, the corresponding AC voltage signal is higher.

As used herein, the term "controller" refers to an application specific integrated circuit (ASIC), an electronic circuit, a processor (shared, dedicated, or group) and memory that execute one or more software or firmware programs, a combinational logic circuit, and/or other suitable components that provide the described functionality.

The controller 18 is electrically coupled to each of the low voltage battery 14, the DC-to-AC converting circuit 16, the AC-to-DC converting circuit 20 and the high voltage battery 24. Using a PWM control signal, the controller 18 controls the operation of the switching device 26 by alternating between the first condition and the second condition. In this particular example, the controller can output the PWM control signal comprising a logic signal of about 0VDC to about 5VDC.

The controller 18 can monitor and maintain a desired level of voltage for the corresponding high AC signal. In doing so, the controller 18 can be coupled to one or more sensors that can be employed to sense various battery and/or charging system characteristics and produce associated sensor signals. For example, a first sensor 51 can be coupled to the secondary winding 40 of the transformer 28 to sense the magnitude of the high AC signal. The controller 18 can evaluate the first sensor signal of the first sensor 51 to thereby compare the magnitude of the high AC signal to a predetermined high AC signal target as a basis for controlling a duty cycle of the PWM control signal (which can control a duty cycle of the chopped low DC voltage signal). For example, if the controller 18 determines that the corresponding high AC voltage signal is too low, the controller 18 can increase the duty cycle of the PWM control signal and thus increase the corresponding high AC voltage signal. When the controller 18 determines that the corresponding high AC voltage signal is too high, the controller 18 can reduce the duty cycle of the PWM control signal, and thus, decrease the corresponding high AC voltage signal.

More specifically, the controller 18 can adjust the duty cycle of the chopped low DC voltage signal T to produce a high AC voltage signal of a desired magnitude, which in turn can produce a high DC voltage signal of a corresponding magnitude that is used to charge the high voltage battery 24. It will be appreciated that the magnitude of the high DC voltage signal can be adjusted to achieve maximum charging efficiency for the high voltage battery 24. The magnitude of the high DC voltage signal can be determined based on a number of factors including low voltage battery temperature, high voltage battery temperature and/or transformer temperature. For example, the controller 18 can control the high DC voltage signal to a predetermined minimum magnitude, such as a trickle voltage or flash voltage.

The controller 18 can monitor a state of charge of the high voltage battery 24. A second sensor S2 can be coupled to the high voltage battery 24 and the controller 18 to monitor the state of charge. The controller 18 can evaluate the second sensor signal of the second sensor S2 to thereby compare the magnitude of the state of charge to a predetermined state of charge. For example, if the magnitude of the state of charge is equal to or about the predetermined magnitude of the state of charge, the controller 18 can stop outputting the PWM control signal, the PWM charging signal or both in order to prevent, and protect the high voltage battery 24 from, an overcharging condition. Further discussion will follow regarding the PWM charging signal.

The controller 18 can include a plurality of temperature sensors S3 coupled to each of the transformer 28, the low voltage battery 14, and the high voltage battery 24. Using each of the plurality of temperature sensors S3, the controller 18 can monitor the transformer temperature, the low voltage battery temperature and the high voltage battery temperature. By monitoring the temperature of the low voltage battery 14 and the high voltage battery 24, the controller 18 can prevent an over-charging condition related to the high voltage battery 24. Additionally, the controller 18 can monitor the temperature of the transformer and limit over-temperature conditions.

The AC-to-DC converting circuit 20 can receive and convert the high AC voltage signal into a nearly constant high DC voltage signal. In this particular example, the AC-to-DC converting circuit 20 can be electrically coupled to the DC-to-AC converting circuit 16 and can include a rectifier circuit 42 and a filter 44.

The rectifier circuit 42 can receive and convert the high AC voltage signal into a high DC voltage signal. The rectifier circuit 42 is electrically coupled to the second winding 40 of the transformer 28 and can include a plurality of diodes 46, 48 such as a first set of diodes 46 and a second set of diodes 48. The rectifier circuit 42 can operate in a first condition and a second condition. In the first condition, the first set of diodes 46 is forward-biased and the second set of diodes 48 is reversed-biased. In this condition, the high AC voltage signal is positive, flows into the first set of diodes 46 and an output voltage looks like a first positive wave half. In the second condition, the first set of diodes 46 is reversed-biased and the second set of diodes 48 is forward-biased. In this condition, the high AC voltage is negative, flows into the second set of diodes 48 and outputs a second voltage that looks like a second positive wave half.

The filter 44 can receive and convert the high DC voltage signal into a nearly constant DC voltage signal. In this particular example, the filter 44 is coupled to the rectifier circuit 42. The filter 44 can reduce small voltage variations or ripples in the high DC voltage signal to produce the nearly constant DC voltage signal.

The charging switching device 22 can control an amount of charging current that is sent to the high voltage battery 24. The charging switching device 22 can be electrically coupled to the filter 44 of the AC-to-DC converting circuit 20. The charging switching device 22 can include at least one transistor acting as an effective electronic switch, for example a BJT, FET or MOSFET transistor. Using the PWM charging signal, the charging switching device 22 can operate in a first condition and a second condition. In the first condition, the charging switching device 22 can be OFF. In this condition, the charging switching device 22 prevents the nearly constant DC voltage signal from charging the high voltage battery 24. In the second condition, the charging switching device 22 can be ON. In this condition, the charging switching device 22 allows the nearly constant DC voltage signal to charge the high voltage battery 24. The charging switching device 22 can be operated in the first condition and the second condition via control of the controller 18 or a second controller (not shown).

Figure 5:
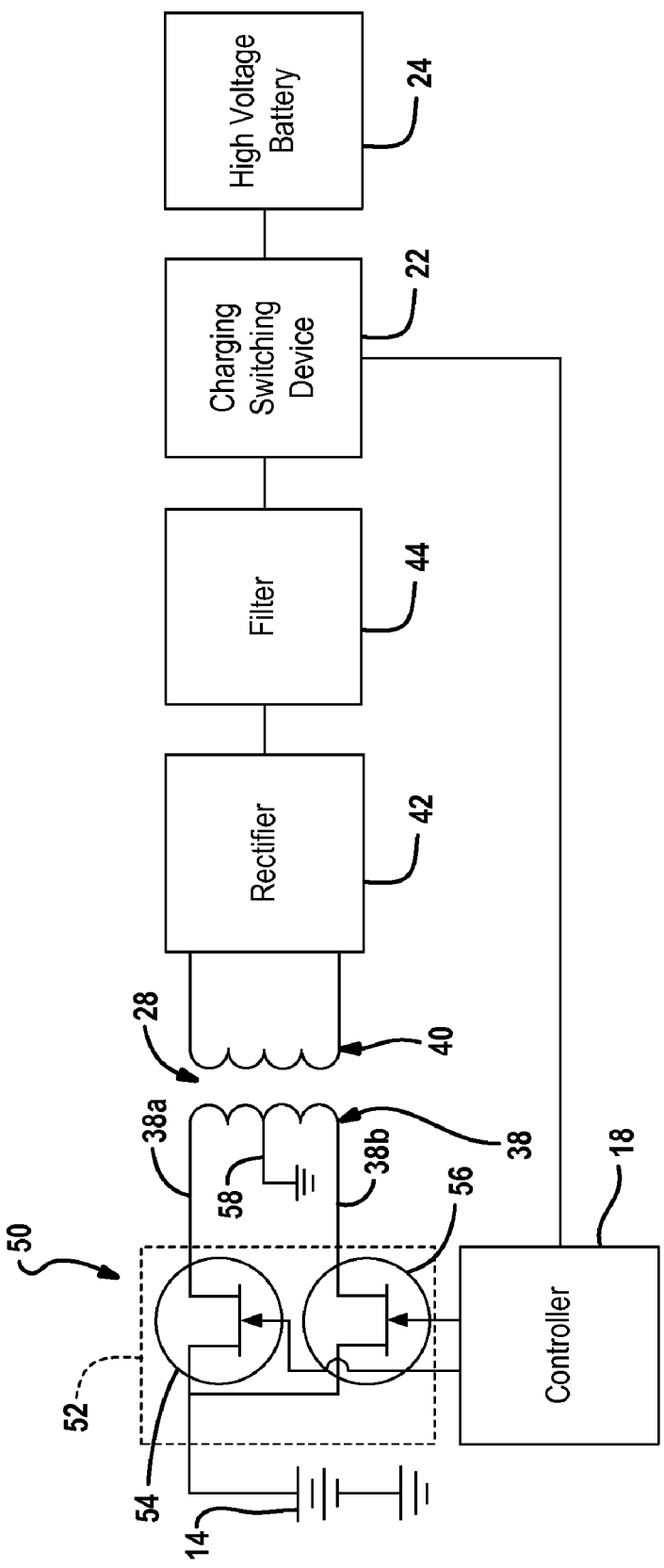
FIG. 5 is a detailed schematic illustration of a second charging system constructed in accordance with the teachings of the present disclosure.

With reference to FIG. 5, a second charging system 50 constructed in accordance with the teachings of the present disclosure is employed. For purposes of clarity, the same reference numbers will be used in the drawings to identify similar elements. The second charging system 50 can include a second switching device 52. The second switching device 52 can include a first transistor 54 and a second transistor 56. In this particular example, the first transistor 54 can be coupled between the low voltage battery 14 and the top 38a of the primary winding 38. Likewise, the second transistor 52 can be coupled between the low voltage battery 14 and the bottom 38b of the primary winding 38. A center-tap 58 of the primary winding 38 can be connected to ground.

The second switching device 52 can operate in a first condition and a second condition. In the first condition, the first transistor 54 is ON and the second transistor 56 is OFF. During this condition, the low DC voltage signal flows through the first transistor 54 into the top 38a of the primary winding 38, out through the center-tap 58 of the primary winding 38 and to the ground. In the second condition, the first transistor 54 is OFF and the second transistor 56 is ON. In this condition, the low DC voltage signal flows through the second transistor 56 into the bottom 38b of the primary winding 38, out through the center-tap 58 of the primary winding 38 and to ground.

Figure 6:
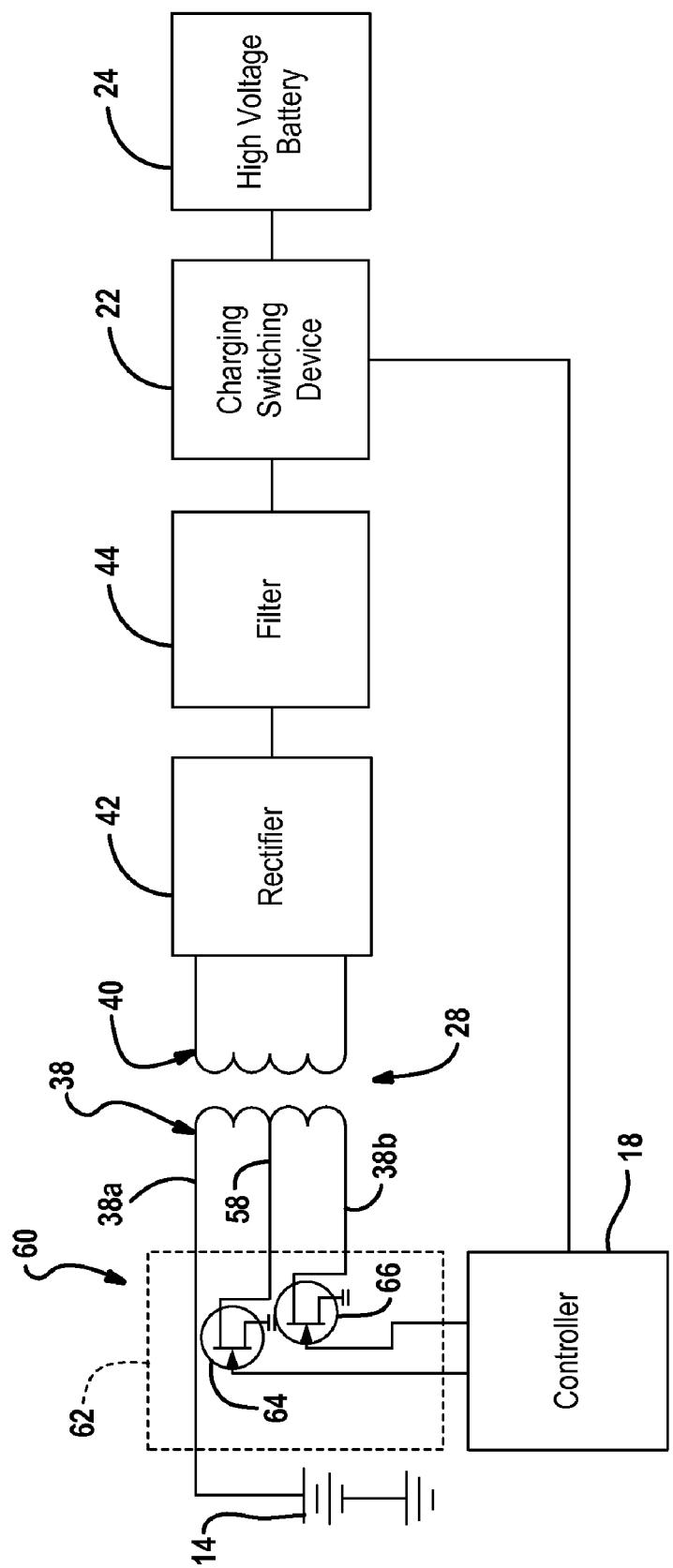
FIG. 6 is a detailed schematic illustration of a third charging system constructed in accordance with the teachings of the present disclosure.

With reference to FIG. 6, yet still a third charging system 60 constructed in accordance with the teachings of the present disclosure is provided. Again, for purposes of clarity, the same reference numbers will be used in the drawings to identify similar elements. The third charging system 60 can include a third switching device 62. The third switching device 62 can include a first transistor 64 and a second transistor 66. The first transistor 64 can be coupled between the top 38a of the primary winding 38 and the ground. The second transistor 66 can be coupled between the bottom 38b of the primary winding 38 and the ground. In this configuration, the center-tap 58 of the primary winding 38 is connected to the low voltage battery 14.

The third switching device 62 can operate in a first condition and a second condition. In the first condition, the first transistor 64 is ON and the second transistor 66 is OFF. This condition allows the low DC voltage signal to flow into the center-tap 58 of the primary winding 38, out of the top 38a of the primary winding 38 into the first transistor 64 and to the ground. In the second condition, the first transistor 64 is OFF and the second transistor 66 is ON. During this condition, the low DC voltage signal flows into the center-tap 58 of the primary winding 38, out of the top 38a of the primary winding 38 into the second transistor 66 and to ground.

While specific examples have been described in the specification and illustrated in the drawings, it will be understood by those of ordinary skill in the art that various changes can be made and equivalents can be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example can be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A battery charging system, comprising:
a DC-to-AC converting circuit adapted to be electrically coupled to a low voltage power source for receipt of a low voltage signal, said DC-to-AC converting circuit configured to chop said low voltage signal into a pulse width modulated signal having high frequency and a duty cycle and operative for converting said pulse width modulated signal into a corresponding high AC voltage signal based on a first condition and a second condition;
a controller operably coupled to said DC-to-AC converting circuit for controlling said first condition and said second condition;
a AC-to-DC converting circuit operably coupled to said DC-to-AC converting circuit for receipt of said corresponding high AC voltage signal in order to convert said high AC voltage signal into a high DC voltage signal in order to charge a high voltage power source using said high DC voltage signal; and
at least one sensor operably coupled to said high voltage power source for sensing a magnitude of said high AC voltage and outputting a sensor signal in response thereof, wherein said controller is operably coupled to said at least one sensor for receipt of said sensor signal to compare said magnitude to a predetermined magnitude of a high AC voltage signal target and adjust said duty cycle of said pulse width modulated signal in response thereof.

2. The battery charging system of claim 1, further comprising:
a charging switching device operably coupled to said AC-to-DC converting circuit and adapted to be electrically coupled to said high voltage power source, said charging switching device is configured to control a charging current of said high voltage power source.

3. The battery charging system of claim 2, wherein said charging switching device operates based on a first charging condition and a second charging condition.

4. The battery charging system of claim 3, wherein said controller is further configured to control said first charging condition and said second charging condition.

5. The battery charging system of claim 3, wherein said charging switching device further comprises a transistor configured ON for said first charging condition and configured OFF for said second charging condition.

6. A battery charging system, comprising:
a switching device adapted to be coupled to a low voltage battery source for receipt of a low DC voltage signal and converting said low DC voltage signal into a chopped DC voltage signal having a high frequency and a duty cycle based on a first condition and a second condition;
a controller operably coupled to said switching device for controlling said first condition and said second condition;
a step-up transformer operably coupled to said switching device for receipt of said chopped DC voltage signal and operative to output a corresponding high AC voltage in response thereof for charging a high voltage battery source; and
at least one sensor operably coupled to said high voltage battery for sensing of a magnitude of a temperature of said high voltage battery and outputting a sensor signal in response thereof, wherein said controller is operably coupled to said at least one sensor for receipt of said sensor signal to compare said magnitude to a predetermined temperature target, said controller is further configured to adjust said duty cycle of said chopped DC voltage signal in response thereof to reduce over charging of said high voltage battery.

7. The battery charging system of claim 6, wherein said switching device further comprises at least one transistor.

8. The battery charging system of claim 7, wherein said at least one transistor further comprises a first set of transistors and a second set of transistors, said first set of transistors and said second set of transistors are configured in an H-bridge configuration.

9. The battery charging system of claim 8, wherein said first condition is indicative of said first set of transistors being ON and said second set of transistors being OFF such that said low voltage signal flows through a first transistor of said first set of transistors, into a top of a primary winding of said transformer and to ground via a second transistor of said first set of transistors.

10. The battery charging system of claim 8, wherein said second condition is indicative of said first set of transistors being OFF and said second set of transistors being ON such that said low voltage signal flows through a first transistor of said second set of transistors, into a bottom of a primary winding of said transformer and to ground via a second transistor of said second set of transistors.

11. The battery charging system of claim 6, further comprising:
a charging switching device operably coupled to said switching device and adapted to be electrically coupled to said high voltage battery source, said charging switching device is configured to control a charging current of said high voltage battery source.

12. A battery charging system comprising:
a switching device adapted to be coupled to a low voltage battery source for receipt of a low DC voltage signal and converting said low DC voltage signal into a chopped DC voltage signal having a high frequency and a duty cycle based on a first condition and a second condition;
a controller operably coupled to said switching device for controlling said first condition and said second condition;
a step-up transformer operably coupled to said switching device for receipt of said chopped DC voltage signal and operative to output a corresponding high AC voltage in response thereof for charging a high voltage battery source; and
at least one sensor operably coupled to said transformer for sensing of a magnitude of a temperature of said transformer and outputting a sensor signal in response thereof;
wherein said controller is operably coupled to said at least one sensor for receipt of said sensor signal to compare said magnitude to a predetermined temperature target, said controller is further configured to adjust said duty cycle of said chopped DC voltage signal in response thereof to reduce over-temperatures of said transformer.

13. A method of charging a battery, comprising:
receiving a low voltage signal from a low DC voltage battery source to chop into a pulse width modulated signal having high frequency and a duty cycle based on a first condition and a second condition;

converting said pulse width modulated signal into a corresponding high AC voltage signal;
converting said high AC voltage signal into a high DC voltage signal in order to charge a high DC voltage battery source using said high DC voltage signal;
controlling a charging current of said high DC voltage battery source using a switching device;
sensing a magnitude of a temperature of said high DC voltage battery source; and
comparing said magnitude to a predetermined magnitude of a temperature target in order to adjust said duty cycle of said chopping low DC signal in response thereof to reduce over charging of said high DC voltage battery source which in turn modifies a magnitude of said high DC voltage signal.

14. The battery charging method of claim 13, wherein converting said pulse width modulated signal further comprises converting said pulse width modulated signal into said corresponding high AC voltage signal using a high frequency transformer.

15. A method of charging a battery, comprising:
receiving a low voltage signal from a low DC voltage battery source to chop into a pulse width modulated signal having a high frequency and a duty cycle based on a first condition and a second condition;
converting said pulse width modulated signal into a corresponding high AC voltage signal using a transformer;
converting said high AC voltage signal into a high DC voltage signal in order to charge a high DC voltage battery source using said high DC voltage signal;
sensing a magnitude of a temperature of said transformer; and
comparing said magnitude to a predetermined magnitude of a temperature target in order to adjust said duty cycle of said pulse width modulated signal in response thereof to reduce over-temperatures of said transformer which in turn modifies a magnitude of said high DC voltage signal.

16. A method of charging a battery, comprising:
receiving a low voltage signal from a low DC voltage battery source to chop into a pulse width modulated signal having a high frequency and a duty cycle based on a first condition and a second condition;
converting said pulse width modulated signal into a corresponding high AC voltage signal;
converting said high AC voltage signal into a high DC voltage signal in order to charge a high DC voltage battery source using said high DC voltage signal;
sensing a magnitude of said high AC voltage signal; and
comparing said magnitude to a predetermined magnitude of a high AC voltage signal target in order to adjust said duty cycle of said pulse width modulated signal in response thereof which in turn modifies a magnitude of said high DC voltage signal.

* * * * *